United States Patent

[11] 3,573,577

[72] Inventor Donald R. Boyd
Waukesha, Wis.
[21] Appl. No. 837,808
[22] Filed June 30, 1969
[45] Patented Apr. 6, 1971
[73] Assignee Allis-Chalmers Manufacturing Company
Milwaukee, Wis.

[54] CONTROL SYSTEM FOR BRUSHLESS SYNCHRONOUS MOTOR
19 Claims, 3 Drawing Figs.
[52] U.S. Cl................................................... 318/176,
318/181, 318/183, 318/193
[51] Int. Cl......................................................... H02p 1/50
[50] Field of Search........................................... 318/167,
174, 176, 181, 183, 193

[56] References Cited
UNITED STATES PATENTS

| | | | | |
|---|---|---|---|---|
| 3,100,279 | 8/1963 | Rohner......................... | | 318/193X |
| 3,308,362 | 3/1967 | Neumann et al.............. | | 318/193X |
| 3,350,613 | 10/1967 | Brockman et al............. | | 318/193X |
| 3,381,196 | 4/1968 | Larose.......................... | | 318/193X |
| 3,381,195 | 4/1968 | Hoffmann..................... | | 318/193X |
| 3,405,538 | 10/1968 | Frola............................. | | 318/193X |
| 3,414,788 | 12/1968 | Hoffmann et al............. | | 318/176 |

*Primary Examiner*—Benjamin Dobeck
*Assistant Examiner*—Gene Z. Rubinson
*Attorneys*—Lee H. Kaiser, Robert B. Benson and Thomas F. Kirby

ABSTRACT: A system for controlling excitation to a synchronous motor has thyristors for connecting a D.C. source to the field winding, means for sensing when motor speed and rotor angle are most favorable for applying excitation, and oscillator means controlled by the sensing means for applying a succession of gating pulses to the thyristors to prevent them from being commutated off before the motor pulls into synchronism. Semiconductor switching means control insertion of the field discharge resistance in circuit with the field winding, and an impedance in shunt with the switching means is selected so that the current through it and the field discharge resistance in series is greater, when the switching means is open, than the hold-in current of the thyristors, thereby assuring that the thyristors are not commutated off before the motor synchronizes.

CONTROL SYSTEM FOR BRUSHLESS SYNCHRONOUS MOTOR

This invention relates to control systems for synchronous motors and in particular to a control system for applying field excitation to a brushless synchronous motor.

Synchronous motors have a stator winding energized with AC to produce a rotating magnetic field and a field winding energized with DC to produce a unidirectional magnetic field which interacts with the rotating field to cause the rotor to rotate in synchronism with the AC frequency. In starting a synchronous motor, the stator winding acts as a primary and the field winding as a secondary of a transformer, and high voltages are induced in the field winding which are a hazard to life and to the winding insulation. In order to eliminate this hazard, the field winding is closed through a field discharge resistance during starting, and just before or after synchronization the field discharge resistance circuit is opened to avoid current drain from the excitation source.

A control system for a synchronous motor usually comprises a field discharge resistance circuit for discharging field current during the startup period and a DC excitation circuit for energizing the motor field winding at synchronous speed as well as just prior to synchronization in order to develop the torque required to synchronize the motor. Rotor mounted rectifiers for supplying the DC excitation are well known, and semiconductor switching means are used for controlling insertion of the field discharge resistance in circuit within the motor field winding whenever the induced field voltage rises to a predetermined value above the excitation voltage in order to prevent the voltage induced in the field winding during startup from exceeding the peak reverse voltage rating and damaging the rectifiers and the winding insulation.

If the field is applied under the most favorable conditions of speed and rotor angle, the motor has the best chance of pulling into synchronism. If the direct current application is not precisely timed, the motor may slip back from synchronism and be tripped from the line, or the stator may momentarily draw greater power from the line than desired. The most favorable rotor angle occurs very near the point where the induced field current is zero and is just changing polarity since at this moment the stator and rotor flux linkages are maximum and excitation current will build up rapidly if the DC is applied to the field. An improved control system for a brushless synchronous motor is disclosed in U.S. Pat. No. 3,381,396 to LaRose, having the same assignee as this invention, which utilizes semiconductor exciter switch means such as a controlled rectifier for applying excitation to the field winding which withholds excitation during startup, and such control system includes slip frequency and just as the slip voltage is reversing from a positive to a negative polarity. This control system also utilizes semiconductor switch means for inserting and removing the field discharge resistance, and it applies a gating pulse to the exciter switch controlled rectifier (which connects excitation to the field winding) at a phase point of the slip voltage which assures reverse biasing of the field discharge resistance semiconductor switch, and thus that the discharge resistance is removed, when DC exciting current starts to flow into the field winding.

When controlled rectifier exciter switch means are utilized to apply excitation to the field winding in the manner disclosed in the LaRose patent, the motor may fail to pull into synchronism if the controlled rectifiers are commutated off during the negative half cycle of the slip voltage. Further the slip frequency sensing means of the control system may see a relatively high constant frequency voltage generated in the field winding under certain fault conditions, such as one phase in the stator winding being unbalanced, and such constant frequency signal prevents application of excitation to the field winding because the slip voltage frequency, as seen by the sensing means, never diminishes to the predetermined optimum frequency at which the gating signal is generated for firing the controlled rectifier exciter switch.

It is an object of the invention to provide an improved brushless synchronous motor control system using controlled semiconductor exciter switch means which prevents the exciter switch means from being commutated off before the motor pulls into synchronism.

It is a further object of the invention to provide such an improved brushless synchronous motor control system which assures that the motor will pull into synchronism on reluctance starting even if a motor fault results in the generation of a constant frequency voltage in the field winding.

These and other objects and advantages of the invention will become more apparent upon consideration of the following detailed description along with the accompanying drawing wherein.

Figure 1:
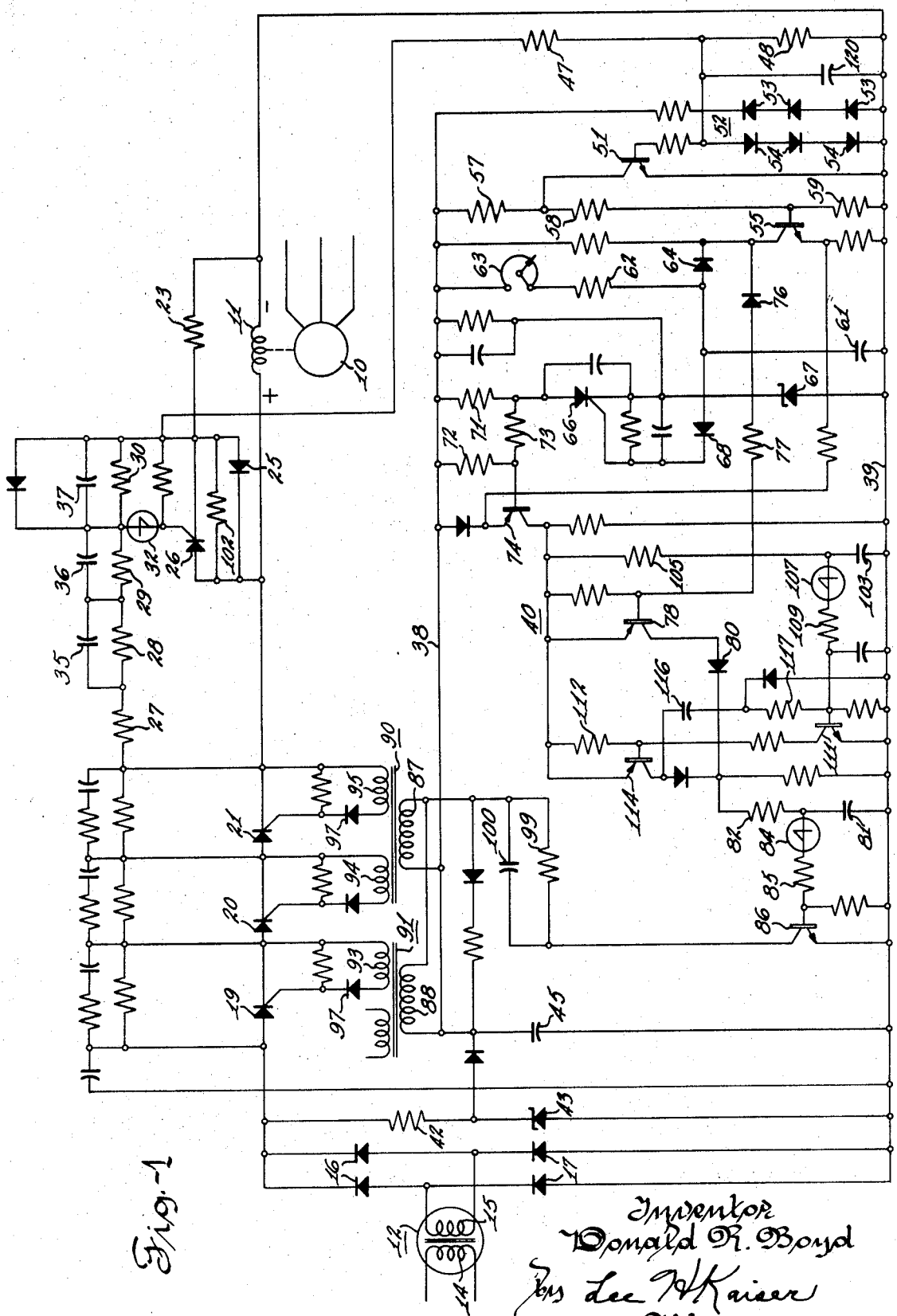
FIG. 1 is a circuit diagram of a control system embodying the invention.

Referring to FIG. 1, a three phase synchronous motor has a three-phase stator winding 10 and a field winding 11. Stator winding 10 is energized from a suitable three-phase AC source (not shown) and produces a rotating magnetic flux field in the air gap of the motor which interacts with the motor field winding and amortisseur windings (not shown) to produce startup and synchronous operating torque for the motor. An excitation source for supplying unidirectional current to field winding 11 is shown as a rotating transformer 12 adapted to have its input winding 14 connected to a suitable single-phase alternating current power supply and its output winding 15 mounted on the motor shaft and a full-wave bridge rectifier comprising diodes 16 and 17 mounted on the motor shaft, although the excitation source is illustrated and described as being derived from a single-phase power supply, it will be appreciated that a three-phase exciter or a three-phase rotating transformer can supply power to a three-phase full-wave bridge to provide unidirectional current for field winding 11.

Semiconductor exciter switch means for applying the DC excitation to the motor field winding 11 at the optimum slip frequency and rotor angle may comprise series arranged controlled rectifiers, or thyristors 19, 20 and 21 connected between the diode bridge rectifier and the field winding 11. The exciter switch controlled rectifiers, or SCR's 19, 20 and 21 withhold the rectified voltage from the field winding until the predetermined optimum slip voltage frequency and rotor angle occurs.

A motor starting, or field discharge resistance 23 is connected across the field winding 11 in series with two unidirectional current conducting devices connected in parallel, inverse polarity relation, one of which is a diode 25 and the other of which is controllable and preferably in a field discharge resistance switch controlled rectifier, or thyristor 26. The field discharge resistance SCR switch 26 is fired only during motor starting and acceleration so that the synchronous motor starts and accelerates like an induction motor. The polarity of diode 25 is opposed to that of the excitation source so that diode 25 is reverse biased after excitation is applied thereby the field resistance 11 is effectively removed from the motor circuit once the motor attains synchronous speed.

The alternating flux field from stator winding 10 induces a slip voltage in field winding 11 by transformer action at the same frequency as the alternating current source as long as the rotor is at rest and which decreases as the rotor accelerates. When the slip voltage induced in field winding 11 has the polarity opposite to that shown in the drawing, SCR 26 will not conduct but diode 25 will and completes a circuit for current to flow through field discharge resistance 23. During the next half-cycle when the polarity of slip voltage is as shown in the drawing, diode 25 blocks current flow but field discharge resistance controlled rectifier 26 is forward biased. The control system includes means for firing the discharge resistance SCR switch 26 when it is forward biased and the slip voltage reaches a predetermined potential above the voltage of the excitation source. A voltage divider comprising resistors 27, 28, 29 and 30 connected in series with the field discharge resistance 23 across the field winding 11 applies a fraction of the slip voltage across a breakover diode 32. When the slip voltage induced in field winding 11 reaches a preselected value above the excitation source potential, breakover diode 32 conducts and applies a firing pulse to the gate of field discharge resistance SCR switch 26. A discharge path is thereby provided through field discharge resistance 23 for the voltage induced in field winding 11, the half-cycles of one polarity being conducted through diode 25 and the half-cycles of opposite polarity through SCR switch 26. Capacitors 35, 36 and 37 connected in shunt with resistors 28, 29 and 30 respectively assured that diode 32 breaks over at the same predetermined voltage regardless of the waveshape or the frequency of the slip voltage. Alternate conduction of diode 25 and field discharge controlled rectifier 26 continues at a decreasing rate as the rotor accelerates. The frequency of the slip voltage induced in field winding 11 is inversely proportional to rotor speed and becomes zero at synchronous speed.

Regulated and filtered power for a motor speed and rotor position sensing means 40 is provided across a positive bus 38 and a negative bus 39 and is derived from the full-wave rectifier through a dropping resistor 42 and is regulated by a Zener diode 43. Alternating current ripple is removed by a filter capacitor 45. The slip voltage appearing across field discharge resistor 23 is reduced by a voltage divider comprising resistors 47 and 48 to a suitable voltage level for electronic components, and the voltage appearing across resistor 48 is the input to a polarity sensing means including a transistor switch 51 normally biased to the conductive state. The positive and negative cycles of the input signals to the polarity sensing means appearing across resistor 48 are respectively clipped in a first branch of a clipping circuit 52 having a plurality of similarly oriented, serially connected diodes 53 and in a second branch having a plurality of oppositely oriented, serially connected diodes 54. The clipped pulses are applied to the base of transistor switch 51 which is forward biased to keep it turned on when no voltage, and also when a positive voltage, appears across field discharge resistor 23. The base of transistor switch 51 of the polarity sensing means becomes reverse biased by the clipped signal developed across resistor 48 so that transistor 51 is turned off during each negative cycle of the slip voltage induced in field winding 11, and the base of transistor 51 again becomes forward biased so it conducts during the positive half-cycles of the slip voltage. When transistor switch 51 is turned on, transistor switch 55 of the slip frequency detecting means is turned off. When transistor switch 51 is turned off, transistor switch 55 is turned on. A voltage divider comprising three serially connected resistances 57, 58, 59 is connected across the positive and negative busses 38 and 39 of the power supply, and the voltage developed across resistor 59, when transistor switch 51 is turned off, forward biases the base of transistor switch 55 and turns it on. When transistor switch 51 is turned on by the positive half-cycle of slip voltage, the voltage developed across resistor 57 (by the current flowing through it and the collector-emitter circuit of transistor 51) reverse biases the base of transistor switch 55 and turns it off.

Figure 2A:
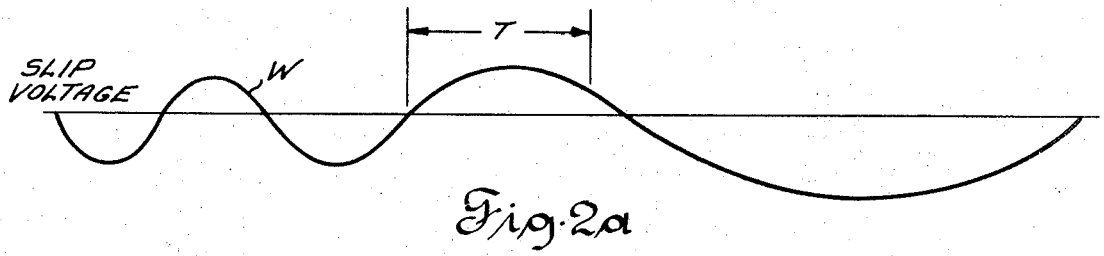
FIGS. 2a and 2b are curves schematically showing the slip voltage induced in the field winding and the gating signal applied to the exciter switch controlled rectifier means during starting.

When transistor switch 55 is turned off at the beginning of each positive half-cycle of slip voltage, a first timing capacitor 61 of an RC timing circuit of the slip frequency detecting means charges through a resistor 62 and a rheostat 63. When transistor switch 55 is turned on near the beginning of each negative half-cycle of slip voltage, first timing capacitor 61 discharges through a diode 64 and the collector-emitter circuit of transistor switch 55. The frequency of the slip voltage induced in field winding 11 is inversely proportional to rotor speed and decreases as the rotor approaches synchronous speed, and the voltage built up on first timing capacitor 61 during each positive half-cycle of slip voltage increases as slip frequency decreases. When the slip voltage attains the optimum frequency for synchronization, the positive half-cycle of slip voltage W shown in FIG. 2a is sufficiently long so that the potential built up on first timing capacitor 61 reaches a preselected level that fires a controlled rectifier 66 of a latching and level detecting circuit. The voltage on first timing capacitor 61 must be greater than the breakdown voltage of a Zener diode 67 connected to the cathode of SCR 66 plus the forward drop of a diode 68 connected between the gate of SCR 66 and capacitor 61 plus the forward drop of the cathode-gate junction of SCR 66. The current flowing through SCR 66, after it is gated on, is maintained above its hold-in current by a resistance network comprising a resistance 71 connected in parallel with a voltage divider comprising series arranged resistances 72 and 73 between the positive bus 38 and the anode of SCR 66. The junction of resistances 72 and 73 is coupled to the base of a transistor 74 of the latching circuit, and the voltage drop across resistance 72 when SCR 66 conducts forward biases the base of transistor 74 and turns it on. SCR 66 and transistor 74 remain conducting regardless of the state of transistor switches 51 and 55.

Figure 2B:
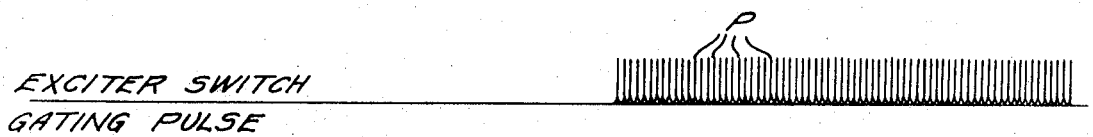

When the slip voltage goes negative after SCR 66 and transistor 74 are latched on, transistor switch 51 turns off and transistor switch 55 turns on. The change of voltage at the collector of transistor switch 55 is coupled through a diode 76 and a resistance 77 and forward biases the base of a transistor 78 to turn it on. The current flow through the emitter-collector circuit of transistor 78 and a blocking diode 80 charges a second timing capacitor 81 through a resistance 82. The voltage builds up on second timing capacitor 81 until it reaches a level required to fire a breakover diode 84 which conducts to discharge capacitor 81. Resistance 82, second timing capacitor 81 and breakover diode 84 constitute a high-frequency oscillator and generate a succession of pulses as capacitor 81 repeatedly charges until it breaks over diode 84, which conducts to discharge capacitor 81. The output pulses from the high-frequency generator are coupled through a resistance 85 to the base of a pulsing amplifier transistor 86 and turn it on. Pulsing transistor 86 is turned on by each pulse from the high-frequency oscillator and energizes the primary windings 87 and 88 of a pair of pulse transformers 90 and 91. Secondary windings 93, 94 and 95 on the pulse transformers 91 and 90 are connected across the gate-cathode junction of exciter switch controlled rectifiers 19, 20 and 21 respectively. Pulsing amplifier transistor 86 is turned on by each pulse from the high-frequency oscillator and energizes the primary windings of pulse transformers 90 and 91, and the pulses are induced in the secondary windings 93, 94 and 95 in a direction to apply positive gating pulses P, as shown in FIG. 2b, through diodes 97 to the gates of exciter switch controlled rectifiers 19, 20 and 21 to fire them and connect excitation to the motor field winding 11. A current limiting resistance 99 is connected between the collector of pulse amplifying transistor 86 and the primary windings 87 and 88 of the pulse transformers 90 and 91, and a capacitor 100 in shunt to resistance 99 assures that pulses delivered to the primary windings 87 and 88 have sharp leading edges.

Field winding 11 of the synchronous motor is highly inductive and its time constant $L/r$, which controls the rate of change of current, may be so high that the excitation current flowing through field winding 11 may not build up to the magnitude of the hold-in current for SCR's 19, 20 and 21 in one-half cycle of fullwave excitation current which forward biases the anode-cathode junction of the exciter switch controlled rectifiers 19, 20 and 21. Inasmuch as each 120 c.p.s. positive half-cycle decays to zero, forward bias is periodically removed from the exciter switch SCR's 19, 20 and 21 and they may be commutated off before the excitation current flowing in field winding 11 rises above their hold-in current. Further, field discharge resistance switch SCR 26 is reverse biased so that the field resistance circuit is open during the negative half-cycle of slip voltage when exciter switch SCR's 19, 20 and 21 are gated, and consequently the hold-in current for the exciter switch SCR's cannot flow through the field discharge resistance 23. In accordance with the invention, a resistance 102 is connected in shunt with diode 25 and field discharge switch SCR 26, and the resistance 102 is selected so that the current flow through it and field discharge resistance 23 in series is greater than the hold-in current of exciter switch SCR's 19, 20 and 21, thereby preventing them from being commutated off when the fullwave half-cycle of excitation current decays to zero. Further, the high frequency oscillator including second timing capacitor 81, resistance 82 and breakover diode 84 continues to generate output pulses which result in the application of successive gating pulses P (see FIG. 2b) to exciter switch SCR's 19, 20 and 21 during the remainder of the negative half-cycle of slip voltage to assure that they remain conducting and that the rotor pulls into synchronism. Preferably the output pulses from the high frequency generator (and thus the gating pulses P shown in FIG. 2b) are of approximately 100 microseconds duration.

The normal synchronizing condition is illustrated in FIGS. 2a and 2b. When the slip voltage W induced in field winding 11 is positive, transistor switch 51 of the polarity sensing means is on, transistor switch 55 is off, and first timing capacitor 61 of the frequency sensing means is charging. When the slip voltage frequency decreases to the optimum value for synchronizing and the slip voltage wavelength correspondingly exceeds a preselected time, such as T shown in FIG. 2a, SCR 66 and transistor 74 are latched on. Slightly after the slip voltage W goes negative, transistor switch 51 goes off, transistor 55 goes on, transistor 78 turns on to energize the high-frequency oscillator (including resistance 82, second timing capacitor 81 and breakover diode 84) which generates output pulses that cyclically turn on pulse amplifier transistor 86 and result in the series of firing pulses, shown at P in FIG. 2b, being applied to the gates of exciter switch thyristors 19, 20 and 21, thereby preventing the thyristors 19, 20 and 21 from being commutated off and assuring that the rotor pulls into synchronism.

If the synchronous motor pulls into synchronism on reluctance torque, no voltage is induced in field winding 11. In this event transistor switch 51 of the polarity sensing means remains turned on and transistor switch 55 remains off. First timing capacitor 61 charges through resistance 62 and rheostat 63 until it attains the voltage level which will gate SCR 66 of the latching circuit and thereby turn on transistor 74. The current flowing through the emitter-collector circuit of transistor 74 charges a third timing capacitor 103 of a long time delay RC circuit through a resistance 105. After a delay of approximately 2 seconds, the voltage will build up on capacitor 103 to a level sufficient to trigger a breakover diode 107 into conduction, thereby discharging capacitor 103 through a resistance 109 into the base circuit of a transistor 111 and turning it on. The voltage drop developed by the current flowing through a resistor 112 in the collector circuit of transistor 111 forward biases the base of a transistor 114. Current flowing through transistor 114 charges second timing capacitor 81 through resistance 84 until it attains a voltage which will trigger breakover diode 84, thereby energizing the high frequency oscillator which provides a succession of output pulses. The output pulses from the high-frequency oscillator cyclically turn on pulse amplifier transistor 86 and result in application of gating pulses P to the exciter switch SCR's 19, 20 and 21 as previously described. The collector of transistor 114 is coupled through the series arrangement of a capacitor 116 and resistor 117 to the base of transistor 111. When transistor 114 is turned on, the potential of the base of transistor 111 is raised to increase the forward bias thereon, and transistor 111 remains conducting until capacitor 116 is charged sufficiently through resistance 117 to reverse bias the base of transistor 111. The holding of transistor 111 on by such time delay circuit results in the high frequency oscillator generating output pulses (and the gating pulses P being applied to exciter switch SCR's 19, 20 and 21) for an interval longer than the time delay required for the excitation current flowing through the field winding 11 to build up to a magnitude greater than the hold-in current of SCR's 19, 20 and 21.

Fault conditions in the motor, such as one phase of the stator winding being unbalanced, may result in a high and constant frequency voltage being induced in the field winding 11 during starting. Such constant frequency voltage would appear to the frequency detecting means as if the motor were running in reverse and would prevent the first timing capacitor 61 from accumulating sufficient charge to trigger the latching means on, thereby preventing the application of excitation to the field winding. Low pass filter means, including capacitor 120 connected in shunt with resistor 48 and with the diode branches of the clipping circuit 52, remove frequencies above approximately 60 cycles per second from the input signal applied to the base of transistor 51 of the frequency and rotor position sensing means, thereby permitting the sensing of the low frequency slip voltage when the rotor approaches synchronism.

Although but one embodiment of the invention has been illustrated and described, it will be apparent to those skilled in the art that various modifications and changes can be made therein without departing from the spirit of the invention or the scope of the appended claims.

I claim:

1. A control system for a synchronous motor having a DC field winding comprising, a unidirectional excitation source for said field winding, a controlled exciter switch adapted to become conductive when a triggering signal is applied thereto for connecting said excitation source to said field winding, slip frequency and rotor angle sensing means for providing an output when the slip voltage induced in said field winding reaches a predetermined frequency and is in the half-cycle of polarity opposite to said excitation source, and triggering means including an oscillator having a frequency substantially higher than said predetermined frequency responsive to said output for applying a succession of triggering signals to said controlled exciter switch during said half-cycle of opposite polarity of said slip voltage.

2. A control system in accordance with claim 1 wherein said exciter switch includes at least one controlled rectifier and said triggering means includes rectifier means and applies a succession of unidirectional firing pulses to the gate of said controlled rectifier during said half-cycle of opposite polarity of said slip voltage.

3. A control system in accordance with claim 2 and including a field discharge resistance, semiconductor switch means for connecting said resistance across said field winding when the voltage induced in said field winding is of the same polarity as, and of a predetermined magnitude greater than, the potential of said excitation source, and means including an impedance for providing a direct current path in shunt with said semiconductor switch means, said impedance being selected so that the magnitude of the direct current flow through it and said field discharge resistance in series is greater, when said semiconductor switch means is open, than the hold-in current of said controlled rectifier exciter switch.

4. A control system in accordance with claim 2 and including low-pass filter means between said field winding and said slip frequency sensing means.

5. A control system in accordance with claim 2 wherein said slip frequency sensing means includes a short time delay RC circuit, and said control system also includes a long time delay RC means for periodically operating said triggering means after a preselected time delay subsequent to starting of said motor greater than that of said short time delay circuit and also including RC time delay means for maintaining said triggering means operated to apply said succession of triggering pulses to said controlled exciter switch for a preselected interval each time said triggering means is so operated, whereby said excitation source is connected to said field winding when said motor pulls into synchronism on reluctance starting.

6. A control system in accordance with claim 2 wherein said triggering means applies firing pulses to the gate of said controlled rectifier until said slip voltage of opposite polarity decays to zero, and wherein said control system includes a field discharge resistance, semiconductor switch means for connecting said field discharge resistance across said field winding when the voltage induced in said field winding is of a predetermined magnitude greater than that of said excitation source, and means including an impedance for providing a direct current path in shunt with said semiconductor switch means selected so that the magnitude of the direct current flow through it and said field discharge resistance in series, when said semiconductor switch means is open, is greater than the hold-in current of said controlled rectifier exciter switch, and wherein said slip frequency sensing means includes an RC short time delay circuit and said control system also includes RC long time delay means for operating said triggering means after a time delay subsequent to starting of said motor greater than that of said RC short time delay circuit, whereby said excitation source is connected to said field winding when said motor pulls into synchronism on reluctance starting.

7. A control system in accordance with claim 2 and including long time delay means responsive to substantially zero slip voltage induced in said field winding for a predetermined time after starting of said motor to periodically operate said triggering means to apply said succession of triggering pulses to said exciter switch for a preselected interval of time, said long time delay means including RC time delay means to maintain said triggering means operated for said preselected interval each time it is so operated, whereby said excitation source is connected to said field winding when said motor pulls into synchronism on reluctance starting.

8. A control system for a synchronous motor having a rotating DC field winding comprising:
    means rotatable with said field winding for providing a unidirectional excitation source;
    a controlled semiconductor exciter switch rotatable with said field winding for connecting said excitation source to said field winding and having a control electrode and becoming conducting when a triggering signal is applied to said control electrode;
    an oscillator adapted, when energized, to generate a succession of pulses,
    means responsive to each said pulse for applying a triggering signal to said control electrode of said exciter switch;
    slip frequency and rotor angle sensing means for providing an output when the slip voltage induced in said field winding reaches a predetermined frequency and is in the half-cylcle of a polarity opposite to said excitation source; and
    means responsive to said slip frequency sensing means output for energizing said oscillator during the remainder of said half-cycle of opposite polarity of said slip voltage and said oscillator having an output pulse frequency substantially higher than said predetermined frequency.

9. A control system in accordance with claim 8 and including long time delay means responsive to substantially zero slip voltage induced in said field winding for a predetermined time subsequent to starting of said motor for periodically energizing said oscillator for a preselected interval of time and including RC time delay means for maintaining said oscillator energized to generate said succession of pulses for said preselected interval of time each time it is so energized, whereby said excitation source is connected to said field winding when said motor pulls into synchronism on reluctance torque.

10. A control system in accordance with claim 8 wherein said exciter switch includes at least one controlled rectifier and said means for applying a triggering signal couples a unidirectional pulse to the gate of said controlled rectifier.

11. A control system in accordance with claim 10 and including a field discharge resistance, a pair of unidirectional semiconductor devices, one of which is controllable, connected in parallel, inverse polarity relation in series with said field discharge resistance across said field winding, means for rendering said controllable device conductive when the slip voltage induced in said field winding is of the same polarity as said excitation source and is of a predetermined magnitude greater than that of said source, and means including an impedance for providing a direct current path in shunt with said pair of semiconductor devices selected so that the direct current flowing through it and said field discharge resistance in series is greater than the hold-in current of said controlled rectifier exciter switch when both of said semiconductor devices are open.

12. A control system in accordance with claim 11 and including low pass filter means between said field winding and said slip frequency sensing means.

13. A control system in accordance with claim 12 wherein said slip frequency and rotor angle sensing means includes polarity detecting means for producing a first signal when said slip voltage is a polarity opposite to said excitation source,
    RC short time delay means for producing a timing output when said first signal exists for a preselected interval,
    latching means for producing and maintaining a latching output in response to said timing output, and
    means responsive to the simultaneous occurrence of said latching output and said second signal for providing said slip frequency sensing means output.

14. A control system in accordance with claim 13 wherein said long time delay means is responsive to said latching output for a time delay substantially greater than said preselected interval of said short time delay means to periodically energize said oscillator.

15. A control system in accordance with claim 9 wherein said slip frequency and rotor angle sensing means maintains said output as long as said slip voltage induced in said field winding is of said polarity opposite to said excitation source, said long time delay means includes means for periodically generating a long time delay signal in response to substantially zero slip voltage being induced in said field winding for a predetermined time and coupling means responsive to said long time delay signal for energizing said oscillator, said coupling means including time delay means for maintaining said oscillator energized for a preselected time interval after each long time delay signal is generated.

16. A control system for a synchronous motor having a DC field winding comprising:
    a unidirectional excitation source for said field winding;
    at least one controlled semiconductor exciter switch for connecting said excitation source to said field winding and having a control electrode and being rendered conductive when a triggering signal is applied to said control electrode;
    an oscillator adapted when energized to generate a succession of pulses;
    means responsive to each said pulse for applying a unidirectional triggering signal to said control electrode;
    polarity sensing means responsive to the slip voltage induced in said field winding for producing a first output when said slip voltage is of the same polarity as said excitation source and also when there is substantially no slip voltage and for producing a second output when the slip voltage is of the opposite polarity;
    slip frequency measuring means receiving the polarity sensing means output for producing a timing output when said polarity sensing means first output exists for a first preselected time;
    latching means for producing and maintaining a latching output in response to said timing output; and
    means responsive to the simultaneous occurrence of said latching output and the second output from said polarity sensing means for energizing said oscillator.

17. A control system in accordance with claim 16 and including long time delay means operable periodically in response to said latching output existing for a second preselected time, which is greater than said first predetermined time, to energize said oscillator for a predetermined time interval.

18. A control system in accordance with claim 17 and including a field discharge resistance, a pair or unidirectional semiconductor devices, one of which is controllable, connected in parallel inverse polarity relation in series with said field discharge resistance across said field winding, means for triggering said controllable device into conduction when the slip voltage induced in said field winding is of the same predetermined magnitude greater than that of said source, and a resistance in shunt with said pair of unidirectional semiconductor devices selected so that the current flowing through it and said field discharge resistance in series is greater than the hold-in current of said exciter switch when both said unidirectional semiconductor devices are nonconductive.

19. A control system in accordance with claim 18 wherein said long time delay means includes an RC circuit wherein said latching output charges a capacitance through a resistance, a breakover device responsive to the voltage on said capacitance to periodically breakdown and generate a long time delay signal when a predetermined voltage is built up on said capacitance, transistor switch means operable in response to said long time delay signal for energizing said oscillator, and RC time delay means for maintaining said transistor switch means operated for a preselected time interval subsequent to generation of said long time delay signal.

PO-1050
(5/69)

UNITED STATES PATENT OFFICE
CERTIFICATE OF CORRECTION

Patent No. 3,573,577      Dated April 6, 1971

Inventor(s) Donald R. Boyd

It is certified that error appears in the above-identified patent and that said Letters Patent are hereby corrected as shown below:

Column 8, line 12, after "voltage" the following was omitted and should be inserted:

--- induced in said field winding is of the same polarity as said excitation source and also when there is substantially no slip voltage and for producing a second signal when said slip voltage ---.

Signed and sealed this 31st day of August 1971.

(SEAL)
Attest:

EDWARD M. FLETCHER, JR.
Attesting Officer

ROBERT GOTTSCHALK
Acting Commissioner of Pa